(12) United States Patent
Goswami et al.

(10) Patent No.: US 12,277,416 B2
(45) Date of Patent: Apr. 15, 2025

(54) MULTI-ENVIRONMENT CELLULAR NETWORK DEVELOPMENT AND TESTING SYSTEM

(71) Applicant: DISH Wireless L.L.C., Littleton, CO (US)

(72) Inventors: Sundeep Goswami, Leesburg, VA (US); Robert Kierzyk, Littleton, CO (US); Said Berrahil, Denver, CO (US); Marc Rouanne, Cherry Hills Village, CO (US); Andrew Trujillo, Highlands Ranch, CO (US)

(73) Assignee: DISH Wireless L.L.C., Littleton, CO (US)

( * ) Notice: Subject to any disclaimer, the term of this patent is extended or adjusted under 35 U.S.C. 154(b) by 69 days.

(21) Appl. No.: 17/876,933

(22) Filed: Jul. 29, 2022

(65) Prior Publication Data

US 2023/0032088 A1 Feb. 2, 2023

Related U.S. Application Data

(60) Provisional application No. 63/227,082, filed on Jul. 29, 2021.

(51) Int. Cl.
*G06F 9/44* (2018.01)
*G06F 8/30* (2018.01)
(Continued)

(52) U.S. Cl.
CPC .................. *G06F 8/71* (2013.01); *G06F 8/65* (2013.01); *G06F 8/77* (2013.01); *H04W 16/18* (2013.01);
(Continued)

(58) Field of Classification Search
CPC ...... G06F 8/71; G06F 8/65; G06F 8/77; G06F 8/60; G06F 11/3664; G06F 11/3476; H04W 16/18; H04W 16/22
See application file for complete search history.

(56) References Cited

U.S. PATENT DOCUMENTS 9,768,893 B1 * 9/2017 Wank ................. H04B 17/0085
10,146,524 B1 * 12/2018 Killmon .................... G06F 8/65
(Continued)

OTHER PUBLICATIONS

T. Francis, A Comparison of Cloud Execution Mechanisms Fog, Edge, and Clone Cloud Computing, Dec. 2018, [Retrieved on Nov. 25, 2024]. Retrieved from the internet: <URL: https://core.ac.uk/reader/329119630> 8 Pages (4646-4653) (Year: 2018).*

*Primary Examiner* — Anibal Rivera
(74) *Attorney, Agent, or Firm* — Kilpatrick Townsend & Stockton LLP

(57) ABSTRACT

Systems, methods, and non-transitory, machine-readable media may facilitate multi-environment cellular network development and testing. A plurality of cloud-based environments that are configured according to an hierarchical order and that allow for development and/or testing of features and/or services with respect to a cellular network may be created. The plurality of cloud-based environments may be communicatively coupled to one or more software repositories via a first plurality of pipelines. The plurality of cloud-based environments may be communicatively coupled to one or more issue monitors via a second plurality of pipelines. The plurality of cloud-based environments may be exposed to service provider systems and allowing the service provider systems to develop and/or test features and/or services with respect to the cellular network within the plurality of cloud-based environments.

20 Claims, 6 Drawing Sheets

(51) Int. Cl.
*G06F 8/65* (2018.01)
*G06F 8/71* (2018.01)
*G06F 8/77* (2018.01)
*G06F 11/36* (2006.01)
*H04W 16/18* (2009.01)
*H04W 24/04* (2009.01)
G06F 8/60 (2018.01)
G06F 11/34 (2006.01)
H04W 16/22 (2009.01)

(52) U.S. Cl.
CPC ............ *G06F 8/60* (2013.01); *G06F 11/3476* (2013.01); *G06F 11/3664* (2013.01); *H04W 16/22* (2013.01)

(56) References Cited

U.S. PATENT DOCUMENTS

| | | | |
|---|---|---|---|
| 10,318,285 B1* | 6/2019 | Jodoin | G06F 11/3612 |
| 11,350,294 B1* | 5/2022 | Balmakhtar | H04W 24/04 |
| 11,809,301 B2* | 11/2023 | Chirkin | G06F 11/3612 |
| 2017/0180459 A1* | 6/2017 | Frank | H04L 41/0866 |
| 2017/0324617 A1* | 11/2017 | Prasad | H04W 24/02 |
| 2019/0129712 A1* | 5/2019 | Hawrylo | G06F 8/20 |
| 2019/0215707 A1* | 7/2019 | Jackson | H04B 17/29 |
| 2021/0173767 A1* | 6/2021 | Zhang | G06F 16/211 |
| 2022/0286363 A1* | 9/2022 | Decrop | H04W 28/0247 |

\* cited by examiner

MULTI-ENVIRONMENT CELLULAR NETWORK DEVELOPMENT AND TESTING SYSTEM

CROSS-REFERENCE TO RELATED APPLICATION

This application claims priority to Provisional U.S. Patent Application No. 63/227,082 filed Jul. 29, 2021, entitled "MULTI-ENVIRONMENT CELLULAR NETWORK DEVELOPMENT AND TESTING SYSTEM," the entire disclosure of which is hereby incorporated by reference, for all purposes, as if fully set forth herein.

TECHNICAL FIELD

This disclosure generally relates to wireless networks, and more particularly to multi-environment cellular network development and testing systems and methods.

BACKGROUND

Cellular networks are highly complex. Historically, such as up to and including 4G Long Term Evolution (LTE) cellular networks, many cellular networks components were implemented using specialized hardware. The advent of open radio access networks (O-RAN) allows for the functionality of many cellular network components to be implemented as software executed on general-purpose hardware platforms. Since dozens or hundreds of different software components need to communicate and function in concert in order for the cellular network to function, extensive testing of the cellular network is necessary.

BRIEF SUMMARY

Certain embodiments disclosed in the present disclosure relate to wireless networks, and more particularly to multi-environment cellular network development and testing systems and methods.

In one aspect, a method for multi-environment cellular network development and testing is disclosed. The method may include one or a combination of the following. A plurality of cloud-based environments that are configured according to a hierarchical order and that allow for development and/or testing of features and/or services with respect to a cellular network may be created. The plurality of cloud-based environments may be communicatively coupled to one or more software repositories via a first plurality of pipelines. The plurality of cloud-based environments may be communicatively coupled to one or more issue monitors via a second plurality of pipelines. The plurality of cloud-based environments may be exposed to service provider systems and allowing the service provider systems to develop and/or test features and/or services with respect to the cellular network within the plurality of cloud-based environments.

In another aspect, a system to facilitate multi-environment cellular network development and testing is disclosed. The system may include one or more processing devices and memory communicatively coupled with and readable by the one or more processing devices and having stored therein processor-readable instructions which, when executed by the one or more processing devices, configure the system to perform operations including one or a combination of the following. A plurality of cloud-based environments that are configured according to a hierarchical order and that allow for development and/or testing of features and/or services with respect to a cellular network may be created. The plurality of cloud-based environments may be communicatively coupled to one or more software repositories via a first plurality of pipelines. The plurality of cloud-based environments may be communicatively coupled to one or more issue monitors via a second plurality of pipelines. The plurality of cloud-based environments may be exposed to service provider systems and allowing the service provider systems to develop and/or test features and/or services with respect to the cellular network within the plurality of cloud-based environments.

In yet another aspect, one or more machine-readable storage devices for storing machine-executable instructions are disclosed. The machine-executable instructions, when executed by one or more processing devices, cause the one or more processing devices to perform one or a combination of the following operations. A plurality of cloud-t environments that are configured according to a hierarchical order and that allow for development and/or testing of features and/or services with respect to a cellular network may be created. The plurality of cloud-based environments may be communicatively coupled to one or more software repositories via a first plurality of pipelines. The plurality of cloud-based environments may be communicatively coupled to one or more issue monitors via a second plurality of pipelines. The plurality of cloud-based environments may be exposed to service provider systems and allowing the service provider systems to develop and/or test features and/or services with respect to the cellular network within the plurality of cloud-based environments.

In various embodiments, consequent to software being received in at least one software repository of the one or more software repositories, the software may be introduced into one environment of the plurality of cloud-based environments according to the hierarchical order to allow testing and/or development of the software within the one environment. In various embodiments, consequent to validation of the software within the one environment, the software or a version of the software may be promoted to a next environment of the plurality of cloud-based environments according to the hierarchical order to allow additional testing and/or development of the software or the version of the software within the next environment. In various embodiments, consequent to detection of one or more issues with the software or the version of the software within at least one environment of the plurality of cloud-based environments, at least one issue monitor of the one or more issue monitors may log the one or more issues, and the software or the version of the software may be returned to a lower of the plurality of cloud-based environments according to the hierarchical order to allow remediation of the one or more issues. In various embodiments, the plurality of cloud-based environments may allow for development and/or testing of the features and/or the services with respect to the cellular network based at least in part on specifications of one or more network states. In various embodiments, at least some of the plurality of cloud-based environments may be virtual development environments instantiated via a cloud infrastructure. In various embodiments, at least some of the plurality of cloud-based environments may be virtual integration environments instantiated via a cloud infrastructure. In various embodiments, the plurality of cloud-based environments may allow the service provider system to test and/or develop features and/or services in parallel with respect to the cellular network.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

Figure 1:
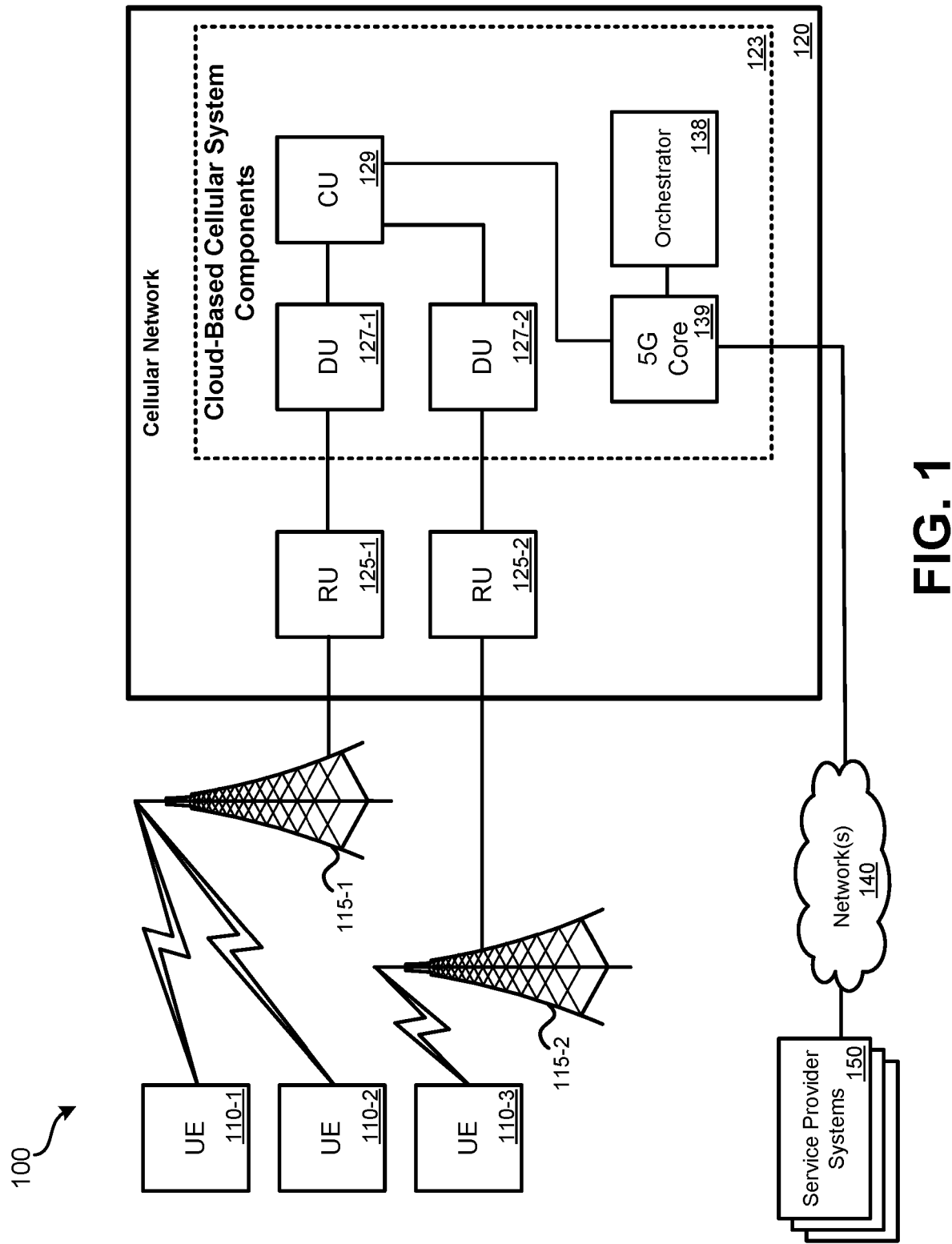
FIG. 1 illustrates an embodiment of a cellular network, in accordance with embodiments according to the present disclosure.

FIG. 1 illustrates an embodiment of a cellular network system 100 ("system 100"), in accordance with embodiments according to the present disclosure. System 100 can include a 5G New Radio (NR) cellular network; other types of cellular networks are also possible. System 100 can include: user equipment 110 (UE 110, UE 110-1, UE 110-2, UE 110-3); base station 115; cellular network 120 infrastructure including hardware, software, switches, routers, etc.; radio units 125 ("RUs 125"); distributed units 127 ("DUs 127"); centralized unit 129 ("CU 129"); 5G core 139, and orchestrator 138. FIG. 1 represents a component level view. In an open radio access network (O-RAN), because components can be implemented as software in the cloud, except for components that need to receive and transmit RF, the functionality of the various components can be shifted among different servers to accommodate where the functionality of such components is needed.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture.

One or more RUs, such as RU 125-1, may communicate with DU 127-1. One or more DUs, such as DU 127-1, may communicate with CU 129. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

5G core 139, which can be physically distributed across data centers or located at a central national data center (NDC), can perform various core functions of the network. 5G core 139 can include: authentication server function (AUSF); core access and mobility management function (AMF); data network (DN) which can provide access to various other networks; structured data storage network function (SDSF); and unstructured data storage network function (UDSF). While FIG. 1 illustrates various components of NDC and cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and orchestrator 138 can be implemented as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system.

Kubernetes, or some other container orchestration platform, can be used to create and destroy the logical DU, CU, 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Various embodiments may provide network slices, network services, or both. The network services provided may include VNFs (virtualized network functions), PNFs (physical network functions), and/or other network services. The VNFs may include software-based functions that may be utilized in conjunction with one or more slices such as security functions, monitoring functions, and/or the like. The PNFs may include hardware components of the cellular network which cellular network control system, which may include orchestrator 138, may configure to provide a network slice and/or other network services to a particular client.

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different than the first set, may be reserved at RU 125-2 and DU 127-2. Further, particular cellular networks slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Service provider systems 150 may include one or more server systems that can interface with a testing and development system 200, which may correspond to one or more portions or all of the cellular network 120, the cloud-based cellular system components 123, and/or the orchestrator 138. The service provider systems 150 may communicate with the testing and development system 200 to conduct development and testing in accordance with embodiments disclosed herein via one or more networks 140, which may include the Internet. The development and testing features disclosed herein may include validating services and features with respect to traffic to and from the network 140. The service provider systems 150 may include, for example, ISV (independent software vendor) systems, device vendor systems, roaming partner systems, and other service provider systems 150, which may or may not be remote, third-party systems, and which may be internal or external to the cellular network 120.

Figure 2:
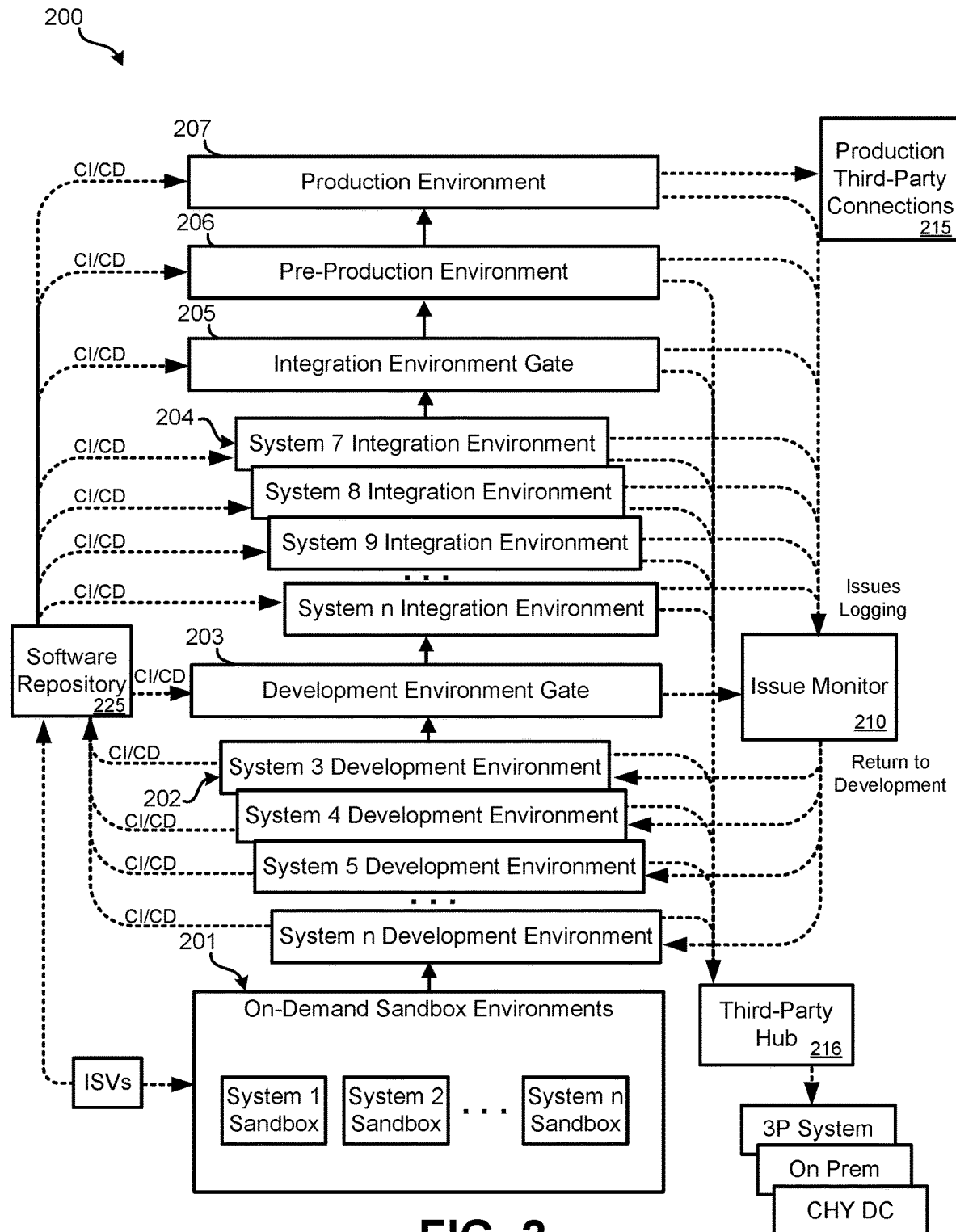
FIG. 2 illustrates a multi-environment cellular network development and testing system, in accordance with embodiments according to the present disclosure.
Figure 2A:
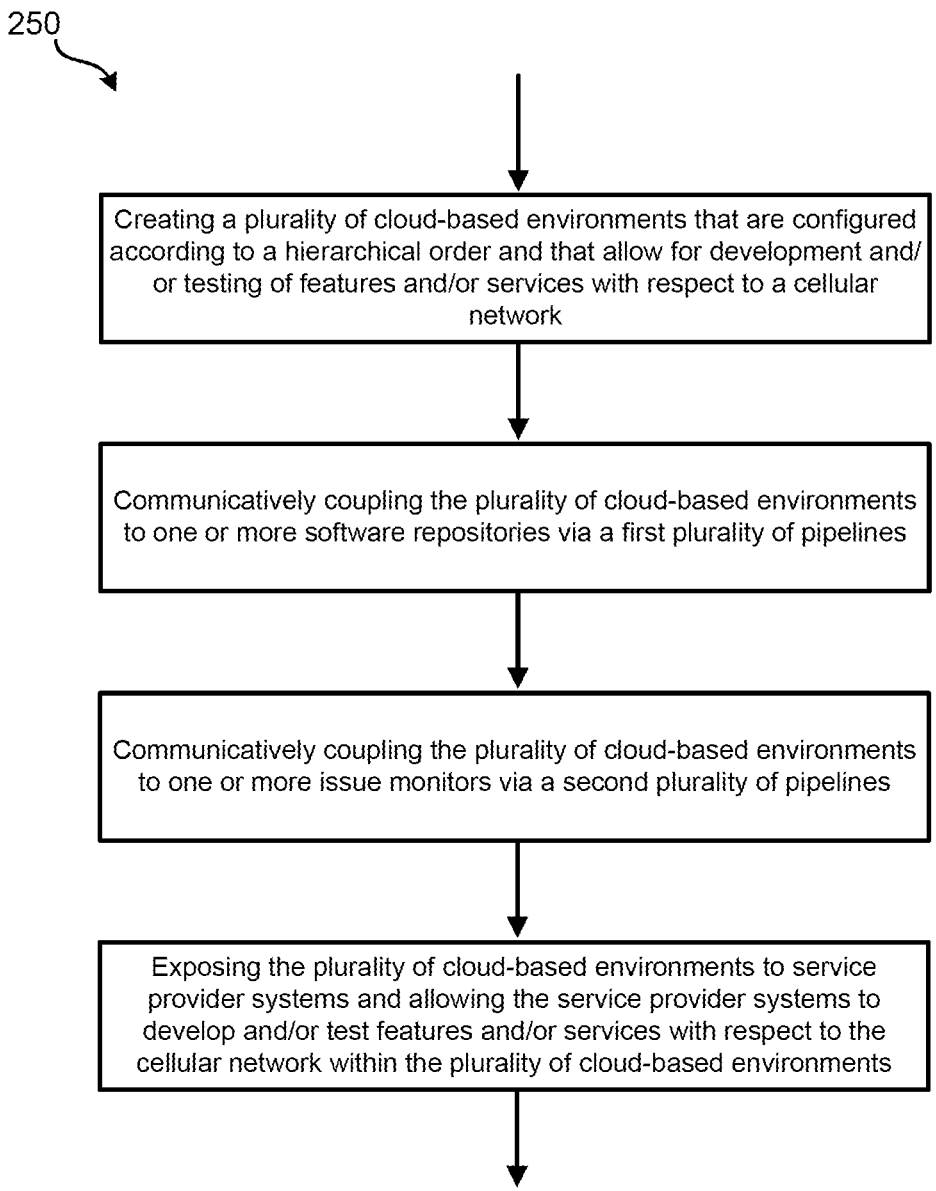
FIG. 2A illustrates a method for multi-environment cellular network development and testing, in accordance with embodiments according to the present disclosure.

FIG. 2 illustrates a multi-environment cellular network development and testing system 200, in accordance with embodiments according to the present disclosure. FIG. 2A illustrates a method 250 for multi-environment cellular network development and testing, in accordance with embodiments according to the present disclosure. Referring again to FIG. 2, illustrated is an example topology and flow of the environment cellular network development and testing system 200 ("testing and development system 200"). Advantageously, the system 200 may be built and operated with elasticity in the cloud and may include a virtual infrastructure that can allow for rapid instantiation, expansion, and takedown of any of the various lab environments disclosed herein on demand. For example, a new environment may be spun up for a new service provider system 150 in a matter of hours or less, or likewise taken down rapidly as needed. In some embodiments, the environments may be configured by the service provider systems 150 with autonomy.

The system 200 may include one or more server systems that allow a service provider system 150 to send one or more requests to the system 200 via one or more networks 140, such as the Internet. The testing and development system 200 may correspond to a massively parallel network of networks testing and development system that may allow for development and testing on target environments as the target environments exist in the field, with real cellular network equipment and real cellular network traffic. The network of networks may be created, updated, and changed on demand—providing the resources, including underlying hardware, to service provider systems 150 for a period of time as needed for development and testing. The network of networks may extend all the way down to service provider systems 150 in a multiplicity of lower environments, each particularized to a particular service provider system 150 while allowing access to live wireless telecom network snapshots. Disclosed embodiments may create a full set of environments that completing mirror what is running in production and target them toward doing different types of activities by service provider systems 150 with in terms of software development or in terms of end-to-end integration. Every layer may mirror production to allow parallel testing and development by multiple service provider systems 150 with replicas of the network before deploying services and features into production.

Conventional development and testing, by contrast, involves merely developing and testing features and services in a lab, where significantly limiting assumptions must be made that are inaccurate with respect to cellular network equipment and cellular network traffic. This corresponds to technical problems that features and services that simply do not work in the real cellular network under real operating conditions (e.g., outdated/wrong assumptions, resulting in configuration/software faults and causing delays), even though the features and services worked in the limited lab environment. Further, the technical problems include slowness of development and deployment of features due at least in part to the separated and isolated lab environment that requires extra steps before actual deployment of the features with respect to the real cellular network under real operating conditions, and, when the features do not work in the real environment, additional re-development and re-testing is required.

The testing and development system 200, however, provides for technical improvements and solutions that enable internal and external service provider systems 150 (e.g., ISV (independent software vendor) systems, device vendor systems, roaming partner systems, and other service provider systems 150, which may or may not be remote, third-party systems) to actually develop and test software with respect to real cellular network equipment and real cellular network traffic. The service provider systems 150 may correspond to operator systems and may develop and test network features and services. A network feature and/or network service may include, for example, NFs (network functions), VNFs, PNFs, CNFs (cloud-native network functions), and/or the like. The technical improvements and solutions disclosed herein accelerate speed of effective development, testing, and deployment of network features and network services, as well as deployment to the production environments. The system 200 provides the ability to test and gather data from a real, live environment, as opposed to a software-simulated environment that does not mimic the actual production target and that causes various problems because the labs are out of sync with respect to the production environment (which slows down the operators ability to take something developed in the labs all the way to production). The system 200 provides multi-level testing on live environments, which speeds up feature development, the hardening of the network, and the gathering of data to create a virtuous cycle for network improvement. The system 200 minimizes the number and types of issues that arise when services and features get rolled into production, while increasing the speed at which services and features can be developed and deployed to the network.

Among other things, for example, CI/CD (continuous integration, continuous delivery/deployment) pipelines that feed the software into the networks (e.g., of the production environment 207) may extend in the system 200 all the way to the lower service provider system 150 environments. The CI/CD pipelines may drive the system 200. For example, when software is moved from a sandbox environment 201 to a development environment 202, or to integration environment 204, to the pre-production environment 207, to the production environment 207, etc., it may be done by a trigger through the CI/CD pipelines. Once the software is dropped into a software repository 225, the CI/CD pipelines may trigger deployment of the software. Each environment may have its own software repository 225, so dropping of the software in the software repository 225 may automatically trigger deployment via the CI/CD pipelines. The data platform that is used across the networks may extend all the way across down to the lower service provider system 150 environments. The orchestration may extend all the way to the lower service provider system 150 environments. The network of networks approach may include development and testing that occurs with respect to clones of the actual network—not at some remote, isolated lab with an ad hoc set of assumptions. The system 200 may exactly replicate the actual network in production (e.g., mirroring the CNFs, the configuration, etc.), without breach of privacy with respect to subscriber data.

The testing and development system 200 may allow service provider systems 150 to access the independent, parallel, comprehensive, and accelerated development and testing services disclosed herein, which provide access to real-time or near-real-time replicas of any or all of the cellular network equipment and cellular network traffic. The production environment 207 may handle live communication traffic by customers of the cellular network provider. The service provider systems 150 can each have access to all or part of the production environment 207 in parallel. The system 200 may create mirror copies of the production environment 207, which the system 200 may instantiate in one, all or another combination of the lower environments 201 through 206 in accordance with various embodiments. This may include snapshots of any or all of the logical data centers (e.g., national data center, regional data center, edge data center, and/or the like) created as a function of parameters of requests from the service provider systems 150. As a function of the requirements of a particular service provider system, the system 200 may create an exact replica of the network in the lower environments, including geo-redundancy, multi-regional deployment, not localized to one location, and/or the like. Advantageously, the system 200 may provide for the ability to test geo-redundancy (telecom network components deployed in production with multiple instances running in multiple, different physical locations to provide high availability of service to traffic on the network even when one or more of the components fail). Say, for example, a particular service provider system 150 specifies a potential deployment of a component in Denver, San Francisco, and DC, system 200 may provide for the ability to test performance and availability of the software. The system 200 may create a multi-region set-up in the development environment particularized to the service provider system 150 so the testing can reveal how failure between the instances may be handled. With conventional technology, this would have been cost-prohibitive to do in a lower environment.

The testing and development system 200 may allow for service provider systems 150 to develop and test features and services in parallel on networks within the production network. The testing and development system 200 may provide for and use multiple environments, specifically instantiated to support the different development, integration, and testing activities as a function of parameters of requests from the service provider systems 150. As illustrated, the testing and development system 200 may include a plurality of environments that hierarchically configured. The hierarchical system 200 may allow for progression of service provider system 150 solutions from the sandbox environments 201 to the production environment 207—by way of the system development environments 202, one or more development environment gates 203, system integration environments 204, one or more integration environment gates 205, and the pre-production environment 206. The testing and development system 200 may minimize the time required to roll out and integrate network functions, features, and services into the upper environments, up to and including the production network. The testing and development system 200 may allow service provider systems 150 the flexibility to instantiate and develop against any combination of or all the network functions included in a network declared state for the 5G network. The system 200 may control processes of updating the declared state, propagating updates via CI/CD (continuous integration, continuous delivery/deployment) pipelines and processes. Then any new environment that the system 200 brings online would then mirror the updated state and everything remains in sync. The testing and development system 200 may ensure that the output of lower environments align with the production environment—e.g., CNFs exiting lower environments may be deployable in production with no design change. Only the variable attributes such as IP addresses and dimensioning may change for production deployment. The testing and development system 200 may create the capability to scale the testing environments with elasticity and turn down environments when they are no longer required. The testing and development system 200 may employ software development practice of developing against a mainline code stream in branches and merging them back into the mainline code—for networks.

The software repository 225 may store all NFs and configurations, the functions and configurations of the radio network as software, the functions and configurations of the 5G Core as software, the functions and configurations of the cloud-based cellular system components 123 and replicas/snapshots thereof, and simulated cellular networks and slices—including versioning of one or a combination of the foregoing, to facilitate deployment of appropriate version of the same into any particular environment. The testing and development system 200 may facilitate deployment in all environments. All NFs deployed in all environments may be done via CI/CD pipelines and processes. There may be no manual deployment of NFs in any of the environments. Activities that necessitate updates to CI/CD pipelines (due to new development, bug fixes, introduction of new platforms or feature, and/or the like), may be documented by the system 200 and/or service provider systems 150. The system 200 may consequents cause updating existing pipelines or creating new pipelines to continue enabling automated deployment of all NFs in the network.

All environments may be used to facilitate continuous testing. Various scopes of testing may be facilitated in each of the environments. By way of example, nodal, pairwise, and high availability testing may be performed in the development environments. 3GPP, performance, and high availability testing may be performed in the dev-performance environments. Integration, 3GPP, and availability testing may be performed in the integration environments. Performance and high availability testing may be performed in the integration—performance environments. 3GPP, performance, high availability, and chaos testing may be performed in the preproduction environments. Performance and chaos testing may be performed in the production environments. Other embodiments are possible to facilitate additional testing strategies and additional test vectors, methodologies, and tools.

All test cases, test results, and any issues identified during testing, in any environment, may be documented and tracked by the issue monitor 210. All KPIs, alarms, logs from any environment may flow into and be stored in a data repository, which may, for example, correspond to a data lake. The data flow to the data repository may occur in the same manner as the flow of data in pre-production and production environments.

The testing and development system 200 may be configured to provide test automation to automate the execution of the tests and capture of results from the test cases. The testing and development system 200 may be configured to provide a first set of one or more test tools for the testing to be shared with the service provider systems 150 so that the service provider systems 150 may select one or more of the tools to execute the testing. The testing and development system 200 may be configured to receive one or more additional sets of one or more test tools from the service provider systems 150. After a tool is uploaded to the testing and development system 200, the testing and development system 200 may install at least temporarily the tool code and execute the tool so that the service provider systems 150 may selectively use the tool to execute the testing.

Any new service provider system 150 introduced to the system 200 may begin by onboarding the NFs of into an on-demand sandbox environment 201. With the on-demand sandbox environment 201 instantiated for the service provider system, the sandbox environment 201 may allow the service provider system 150 to complete initial onboarding processes required to enable onboarding of service provider system 150 NFs/platforms into the system 200. Each service provider system 150 may instantiate its own sandbox environment 201.

The next level in the process flow for the system 200 may include the service provider system 150 instantiating its own development environment 202 to enable the service provider system 150 to develop its functions and carry out pair-wise integration activities. The system 200 may facilitate a progressive flow into upper environments, with appropriate gates, to ensure that service provider systems 150 can continuously develop, integrate, and test solutions against the real cellular network equipment and real cellular network traffic in parallel with other service provider system, without being gated by any other activity by another service provider system.

Network Declared State

The system 200 may maintain multiple, various declared states of the network each of which may be the equivalent of the mainline code in software development. The declared state of the network may specify all or a part of the network (e.g., production environment 207), that is, what is actually running in production. The system 200 may automatically make copies of all or part of the network in the production environment 207 in accordance with the declared network state specifications.

Instantiations of a declared network state may be stored in, made use of by, and/or otherwise correspond to the development environment gate 203 and/or the integration environment gate 205. The declared network state may be maintained and published by the system 200 and may be updated or changed only by the system 200. The system 200 may maintain the declared state of the network by way of updates that are continuous and triggered by detected state changes in the network, periodic, on-demand and triggered by a test/development request, and/or the like. All the network functions, in terms of their versions, configurations, topology, connectivity, and design, may be published as part of the network declared state. The declared network state specifications may be the template for all environments. Accordingly, the declared network state specifications may correspond to a baseline according to which other environments may be set up.

By way of example, a declared network state may be provided to a development environment 202 to provide a declared development environment network state. Say, a service provider system 150 (e.g., ISV) has a new NF for testing. The service provider system 150 may test the NF in the on-demand sandbox environment 201 and may verify that the NF works in the sandbox environment (e.g., with a particular cloud infrastructure, etc.). Then the NF may be elevated to a system development environment 202, which may the access the development environment declared network state that is in the development environment gate 203. The NF may be deployed in the system development environment 202 and may cause failures (e.g., breaking a particular system NRF with the deployment and/or the like). Once any failures are remedied and the NF is validated to be able to be deployed in the system development environment 202 without breaking any other components, then the validated NF may be deployed in the development environment gate 203. The deployment with the previous declared network state may become the new development environment declared network state. The new development environment declared network state may then be communicated to the integration environment gate 205, and can then be propagated down to an integration environment 204.

In the integration environment 204, the NF with the new development environment declared network state may be deployed and may cause one or more issues/defects (e.g., conflicts with devices of a service provider system 150, such as a partner). With the closed-loop tracking features of the system 200, an issue/defect may be monitored by the issue monitor 210, which may log the issue/defect and communicate the issue/defect to one or more corresponding service provider systems 150 (which may include the service provider system 150 developing the NF and/or one or more other service provider systems 150 that may be affected by the NF) and the corresponding development environment 202, and the process flow may be transitioned back to the development environment 202 to start the cycle again so that the development environment testing may continue, with the issue/defect identified, in order to remedy the issue/defect. Once the issue/defects are remedied and the NF is validated in the development environment 202 and promoted via the development environment gate 203 back to being deployed in the system integration environment 204, the deployment with the latest declared network state may become the new integration environment declared network state. The new integration environment declared network state may be communicated to the pre-production environment 206, for use with various types of testing such as load testing. Again, any issues/defects may be monitored by the issue monitor 210, which may log the issue/defect and communicate the issue/defect to one or more service provider systems 150 and the corresponding development environment 202, and the process flow may be transitioned back to the development environment 202 to start the cycle again so that the development environment testing may continue, with the issue/defect identified, in order to remedy the issue/defect. Once the issue/defects are remedied and the NF is validated up through the environments and in the preproduction environment 206, the NF can be pushed to the production environment 207.

Development Environments 202

The development environments 202 may be an equivalent of a branch of the mainline code. Each service provider system 150 may clone all or part of the network declared state into its development environment 202 to conduct its development and testing activities. In various embodiments, the development environments 202 may facilitate testing with respect to RAN (radio access network), 5GC (5G Core), IMS (IP Multimedia Core Network Subsystem), OSS/BSS (operations support system/business support system), orchestrator, TaaS (testing as a service), third-party connections, and/or the like components of the environments.

Each service provider system 150 may develop its own network functions in its development environment 202. Each service provider system 150 may use its own development tools and emulators in its development environment 202. Each service provider system 150 may use copies of surrounding network functions (its own and those of other service provider systems 150) up to an exact and complete copy of the logical data center (e.g., NDC/RDC/B-EDC) where the network function under development is or will be deployed. However, each service provider system 150 may be prevented from modifying the version of the surrounding network functions in its development environment 202 and may be prevented from using network functions that are not part of the declared state in its development environment 202. Additionally, each service provider system 150 may be prevented from changing the network design or architecture in its development environment 202.

Each service provider system 150 may update configurations of its own network function and document the resulting, required configuration changes, in the surrounding network functions (its own or those of other service provider systems 150) based on the testing in the development environment 202. The updated documentation for this may be part of the exit criteria for promotion of the service provider system 150 functions to the next, higher environment, the integration environment 204. Any updated network functions delivered by a service provider system 150 from its development environment 202 would have been tested against all the surrounding network functions. This may be the gating, but not the only, exit criteria for the service provider system 150 functions to be promoted to the next higher environment, the integration environment 204, as illustrated. The system 200 may selectively instantiate and terminate the development environments 202 based on need (e.g., based on triggers from selections of the service provider systems 150 via one or more interfaces and based on the system 200 confirming the requests conform to instantiation rules or termination rules). The development environments 202 may be configured to facilitate isolated, stand-alone development activities by service provider systems 150. The system 200 may communicate with each service provider system 150 to ensure that the CI/CD pipelines associated with the service provider system 150 NFs are updated to account for all the changes required because of the development activities, and resulting outputs, to ensure the newer NF versions can continue to be instantiated and managed with full automation.

Additionally, the system 200 may support connectivity to external clouds and/or entities on a case-by-case basis. Production third-party connections 215 of production may include connections to third-party systems, such as regulatory agency systems, voice exchange systems, and/or the like. The system 200 may use the production third-party connections 215 to integrate live traffic from production network (e.g., calls going out) via regulatory agency systems, voice exchange systems, etc. Third-party hub 216 may mirror the production third-party connections 215 for use with the lower environments to allow for not only validation of endpoints, but also validation of performance, connectivity, and actual quality of service with the replication of the production third-party connections 215. This is an improvement over conventional technology, where labs could be relegated to connecting over a VPN and cannot validate performance, connectivity, and actual quality of service with live traffic and production third-party connections 215.

Development Environment Gate 203

The development environment gate 203 may be the environment that will mirror production based on the network declared state template. This environment may be maintained and controlled by the system 200 and service provider systems 150 may be prevented from changing topology, design, and configurations in this environment. Once a service provider system (e.g., ISV) validates software in a development environment 202, the software may be promoted to the development environment gate 203. Each service provider system 150 may document and provide the system 200 with the required updates to its NF configurations and the surrounding NFs, based on the output of its own development environment 202. The system 200 may apply these changes into the performance development environment 202 to allow for the required testing and validation activities, to promote the configurations and release into the mainline code.

The development environment gate 203 may allow the system 200 to conduct end-to-end 3GPP integration testing. Additionally, the development environment gate 203 may allow performance benchmarking of the network functions against their published performance targets (e.g., validating that the UPF can handle traffic greater than 10 Gbps). The development environment gate 203 may detect and flag and/or tag any issues and ensure that the issues are resolved before promotion to the integration environment 204.

Network configurations and associated NFs that pass the testing in this environment may be deemed to be accepted for deployment in the upper environments, as illustrated. The output of this environment, in the form of MOPs, configurations, and artifacts, may correspond to the final approved release that can then be promoted to upper environments. Releases exiting this environment may be maintained as derivatives of the network declared state in repositories of the system 202 and may be available for deployment into the integration environment 204. Any specific release that is deployed in production may be become the current network declared state.

Integration Environments 204

The integration environments 204 may give access to stable copies of the current network declared state or one of the derivative releases, as disclosed above. While the system 200 may control the integration environment 204, the system 200 give access to service provider systems 150 (e.g., partners). The integration environments 204 may support integration activities by service provider systems 150 (e.g., chipset vendors, device vendors, hardware/RU vendors, roaming partners, and/or the like). Independent of what's going with other environments, a service provider system 150 may use a system-instantiated integration environment 204 to test its chipsets, devices, features, etc., for example, to certify the devices work on the network. Testing may include, for example, performance testing of particular devices, interoperability device testing (IODT), mobile roaming testing, and/or the like. The integration environments 204 may allow service provider systems 150 to do feature testing and certification against a stable network release. In various embodiments, the integration environments 204 may facilitate testing with respect to RAN, 5GC, IMS, OSS/BSS, orchestrator, TaaS, third-party connections, and/or the like components of the environments.

The integration environments 204 may not be used for any kind of development and integration activities by service provider systems 150. If system 200 detects an issue, the system 200 may tag the fault and then flow returns to the development environment 202 so the service provider system 150 with the issue can fix the issue in the development environment 202. Issues discovered with any service provider system 150 NF in the integration environments 204 may be logged and the fixes may be developed in the respective development environment 202 by the impacted service provider system. Successful testing and certification by a service provider system 150 against the network functions may be criteria to exit from this environment. A certified network release may then be promoted to the integration gate environment 205, as disclosed herein.

Integration Environment Gate 205

The integration environment gate 205 may be the final gate for the integration environments 204. The system 200 may control the integration environment gate 205. The integration environment gate 205 may be used develop the final configurations and conduct network performance benchmarking. Successful testing and certification in this environment may be the basis for developing new releases for the upper environments, with the system 200 promoting the services and features to the pre-production environment 206. The output from this environment, in the form of updated NF and network configurations, and updated documentation, may be used by the system 200 to develop updated CI/CD pipelines to deploy and configure network functions in the upper environments.

Pre-Production Environment 206

The pre-production environment 206 may be maintained as an exact copy of the current production network environment 207. However, as new releases are developed in the newer environments, the next target release for production may be introduced into the pre-production environment 206 to allow for full end-to-end feature, high availability (HA) and redundancy, performance, and soak testing for a duration determined by the system 200. When a release successfully passes the required testing in the pre-production environment 206, it may be approved for deployment in the production network environment 207. The release that is rolled into production may then be deemed the current network declared state. In various embodiments, the pre-production environment 206 may facilitate testing with respect to RAN, 5GC, IMS, OSS/BSS, orchestrator, TaaS, third-party connections, and/or the like components of the environment.

Production Environment 207

The production environment 207 may be the current running configuration for the network that forms the basis of the network declared state. New releases promoted from the lower environments may be rolled out to production environment 207 based on specifications of the business and technical requirements of the system 200. In some embodiments, there may be only one network declared state for the network. However, in some embodiments facilitating slicing, there may be multiple versions of the production environment 207, based on the requirements of each of the slices that the system 200 configures for deployment in production. In various embodiments, the production environment 207 may include the RAN, 5GC, IMS, OSS/BSS, orchestrator, third-party connections, and/or the like components of the environment. There may be no development, testing, or integration activities in the production environment(s) 207.

Environment Controls

Each of the environments disclosed herein may have varying degrees of control, in terms of the changes a service provider system 150 may make to the environments it is using. The environments may become progressively more restrictive as network releases move up the stack. While service providers system may be prevented from making changes to the overall network design or topology of the system 200, the service provider systems 150 may have the most control in the following environments.

The system 200 may control most if not all aspects of environments 203 through 207 but may provide environments 201 and 202 to allow more control by service provider systems 150. In a develop environment 202, a service provider system 150 may have control over the version of its NFs, which surrounding NFs are selected for replication into its development environment 202. Additionally or alternatively, a service provider system 150 may make changes to its NF code and configurations. Additionally or alternatively, a service provider system 150 may communicate and cooperate with service provider systems 150 of the surrounding NFs to develop updated configurations for end-to-end integration of its NF. Additionally or alternatively, a service provider system 150 may deploy and use its specific development and test tools to support its development activities. Additionally or alternatively, a service provider system 150 may communicate and cooperate with the system 200 to update infrastructure configurations, as needed.

In an integration environment 204, a service provider system 150 may develop and test its device/chipset features against the 5G network. Additionally or alternatively, a service provider system 150 may communicate and cooperate with other service provider systems 150 to develop configuration changes required to test and certify its solutions. Additionally or alternatively, a service provider system 150 may deploy its specific development and test tools to support its testing and certification activities. Additionally or alternatively, a service provider system 150 may communicate and cooperate with the system 200 to update infrastructure configurations, as needed.

Sync Process

The system 200 may define a sync process to ensure that the different environments are using the network declared state for their parallel development and testing activities. All service provider systems 150 may be notified when a new version of the network declared state is available and may be required to use the automated processes for deploying NFs to sync their respective individual environments to the latest network declared state before continuing development and testing activities. The sync process may be required to ensure that the service provider systems 150 always develop and test against the version of the network that will be in production and, by extension ensure that their NFs and solutions can be rolled into production without need for additional integration and testing.

Figure 3:
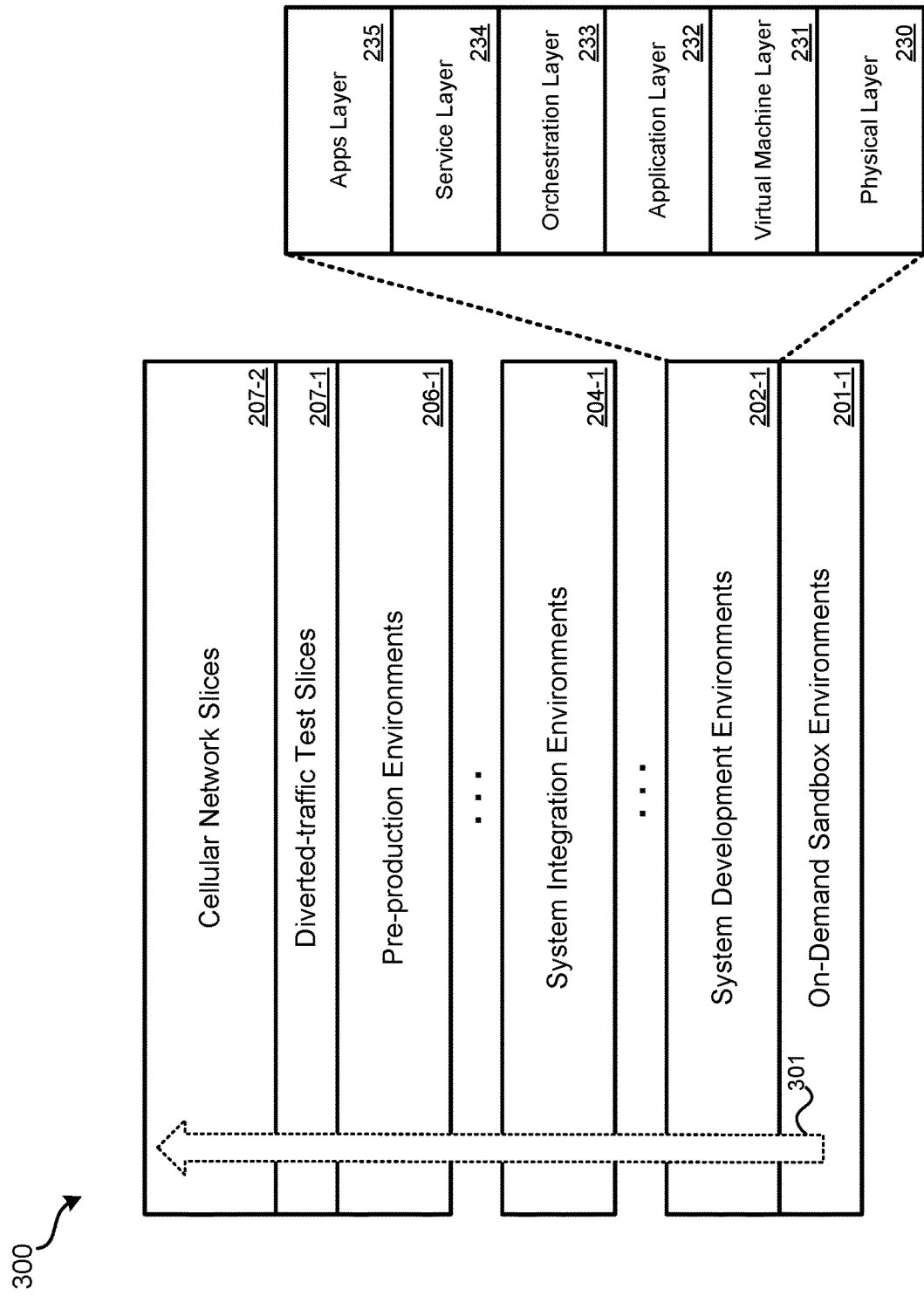
FIG. 3 illustrates a cellular network test environment hierarchy, in accordance with embodiments according to the present disclosure.

FIG. 3 illustrates a cellular network test environment hierarchy, in accordance with embodiments according to the present disclosure. As disclosed herein, testing may involve various types of testing at each of multiple levels of the cellular network test environment hierarchy. Typically, testing of the functionality, communication, and ability to meet specifications, and handle traffic is performed starting from the lowest test environment progressing up to the highest. In some embodiments, to perform such testing, a small portion of the cellular network can be simulated and tested, followed by larger portions of the cellular network. Once satisfied as to performance in a test environment, testing can be performed in a restricted production environment, followed by release into the general production environment. On each of these levels, testing can be performed.

Further, within each test environment, various layers may be present, which each need to be tested. For example, six layers of the development test environment 202 are illustrated; these same layers may be present for each other layer of the test environments. The layers may include: physical layer 230; virtual machine layer 231; application layer 232; orchestration layer 233; service layer 234; and apps layer 235. In other embodiments, fewer or greater numbers of layers may be present within each environment.

Physical layer 230 may refers to the physical infrastructure under test. For example, this may include simulation of one or more servers and the capabilities of such servers and communication between such servers. Virtual machine layer 231 may refer to the layer at which containers of components can be deployed in an O-RAN network. Virtual machine layer 231 can be the layer at which Kubernetes, or some other container orchestration platform, is used to deploy and drain cloud-based instances of cellular network componentry, such as DUs, CUs, cloud-based applications, 5G core componentry, etc.

Application layer 232 may represent the layer at which software components are executed. The cellular network can include the execution of tens, hundreds, and even thousands of applications, some of which need to be in communication with each other. Orchestration layer 233 may refer to the layer at which the confirmation, management, and coordination of processes, tasks, and services is performed. Orchestration can involve reconfiguring, instantiating, and rearranging components of the cellular network in order to realize particular objectives.

Service layer 234 may refer to the layer at which particular types of end-user services, such as voice services, messaging services, and Internet access, are coordinated and performed. Each of these services may need a particular amount of bandwidth and maximum latency, among other QoS metrics, in order to function acceptably. On top, apps layer 235 may refer to the layer at which higher-level requirements are enforced, such as a dynamic quality of service. For example, while for a typical point-to-point voice call, a first amount of latency is acceptable, if a multi-party conference call is occurring over different time zones, it may be possible to dynamically adjust to a different acceptable level of latency.

Each of these layers may be tested as a part of each test environment, both individually and in combination. Testing may be performed in order from least complexity through the production environment, as indicated by arrow 301. In test environment 201, minimal complexity may be involved. This could, for example, involve testing how a new software component interacts with a single other software component of the cellular network. Alternatively, it may involve testing a single software component using simulated cellular network inputs. Testing can be performed on one or more of layers 230-235.

Development test environment 202 could involve significantly less complexity than a production environment cellular network, but greater complexity than minimal complexity test environment 201. For example, a group of software components that communicate with each other may be tested in environment 202. Testing may be performed on one or more of layers 230-235. Integration test environment 204 may, again, include more complexity than development test environment 202 but less than a full network test environment.

Pre-production test environment 206 may represent a complete replica of the cellular network being operated within a test environment. In pre-production test environment 206, volumes of communication traffic may be simulated that are similar to the volumes of traffic experienced within production environment 207. Pre-production test environment 206 may include simulating all (or a significant percentage, such as greater than 50%) of the slices present in production environment 207. Testing can be performed on one or more of layers 230-235 within pre-production test environment 206.

Once testing within the test environment 206 is complete, or concurrently with such testing, some amount of testing may be performed within production environment 207. Within production environment 207, customers of the cellular network may be using the implemented cellular network for communication and therefore expect that their SLAs be met. However, in order to ensure that the modified cellular network is sufficiently robust to handle various failures at layers 230-235, testing may be performed within the production environment.

A cellular network, such as a 5G cellular network, can have slices that handle cellular network traffic for particular customers and/or particular uses according to a SLA. Within production environment 207, only a small number of slices (e.g., one, two, three, etc.) may first use the modified cellular network as part of diverted-traffic test slices 207-1 while the remainder of slices continue using the original production environment. Therefore, a small percentage of live cellular network traffic may first use the modified cellular network. Further, testing may be performed on one or more of layers 230-235 of diverted-traffic test slices 207-1 to ensure that the modified cellular network is performing as expected in the production environment. The number of slices used as part of diverted-traffic test slices 207-1 may be increased during testing to put additional traffic and stress on the modified cellular network. Once testing within diverted-traffic test slices 207-1 has been satisfied, cellular network slices 207-2, representing the remaining or all of the slices of the cellular network production environment, may be processed and transmitted using the modified cellular network.

Figure 4:
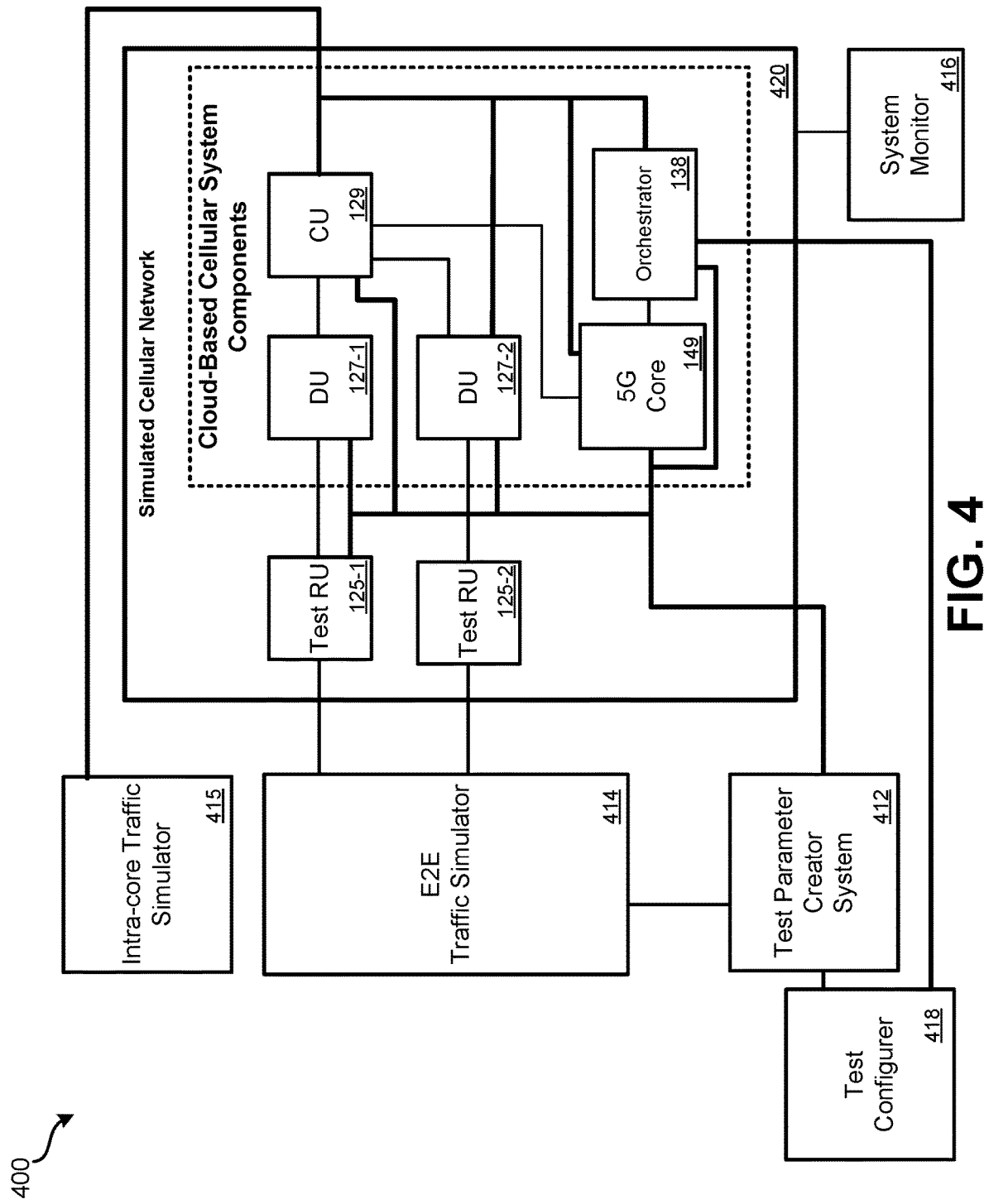
FIG. 4 illustrates a testing system, in accordance with certain embodiments according to the present disclosure.

FIG. 4 illustrates a testing system 400, in accordance with certain embodiments according to the present disclosure. The testing system 400 may correspond to each of the environments of system 200. Accordingly, each of the environments may include and/or make use of one or more aspects of a respective testing system 400. The testing system 400 may include: test parameter creator system 412; end-to-end traffic simulator 414; intra-core traffic simulator 415; system monitor 416; test configurer 418; and simulated cellular network 420. Simulated cellular network 420 can represent an embodiment of the cellular network that is being simulated at varying levels of complexity, such as disclosed above with respect to the test environments. For simulated cellular network 420, components that are not executed using exclusively general-purpose computing equipment, such as radio units, may also be simulated.

The test parameter creator system 412 may be software that is executed on underlying computerized hardware that is in communication with various portions of simulated cellular network 420. The test parameter creator system 412 may be able to simulate traffic, problems, and various other situations which can occur in a production environment as disclosed in relation to layers 230-235 above. Specifically, the test parameter creator system 412 may be able to simulate test cases within 5G core 139, which is where a large number of cloud-native network functions are deployed. The test parameter creator system 412 may be able to communicate directly, via APIs with components of simulated cellular network 420 and may be able to create various test cases in accordance with the various types of tests. Various network functions can attempt to be implemented to see how the network responds. For example, a cloud-native network function (CNF) could be implemented via continuous integration and continuous deployment (CI/CD) with variable latency via Kubernetes. The system monitor 416 (which may correspond to issue monitor 210 in some embodiments) may be used to implement such a function and monitor how simulated cellular network 420 responds.

Various simulators may be used to simulate network traffic. End-to-end (E2E) traffic simulator 414 may be used to simulate UE traffic on simulated cellular network 420. Additionally or alternatively, intra-core traffic simulator 415 may be used to simulate traffic occurring within 5G core 139 or between other cloud-based cellular system components. For example, in a lower-level test environment that does not simulate a large portion of the cellular network, intra-core traffic simulator 415 may be used without any traffic simulation by E2E traffic simulator 414.

While the system monitor 416, the test parameter creator system 412, the E2E traffic simulator 414, and the intra-core traffic simulator 415 may be used in combination with a simulated cellular network or components of a simulated cellular network, such test components may also be used in combination with a production environment, such as diverted-traffic test slices 207-1. As such, various testing and system implementations can be tested on a portion of the production environment prior to the modifications being released to the entirety of the production cellular network environment. Therefore, in an alternative embodiment, cellular network 120 can be used in place of simulated cellular network 420.

The test parameter creator system 412 may, for example, be used to generate and test various failures, degradations, and/or traffic spikes within either simulated cellular network 424 a production environment side network, such as cellular network 120. In some embodiments, at least a portion of the failures generated by the test parameter creator system 412 may be random. For example, a fiber cut in a random location may be tested. However, another portion of the failures generated by test parameter creator system 412 may be based upon failures that have actually occurred on cellular network 120. The system monitor 416 may permit an administrator to monitor how simulated cellular network 420 is performing based upon the test parameters set up injected by the test parameter creator system 412. The system monitor 416 may also allow the administrator to cause various network functions to be executed, such as the instantiation of a new container to perform the functions of one or more cloud-based cellular system components or within 5G core 139.

Figure 5:
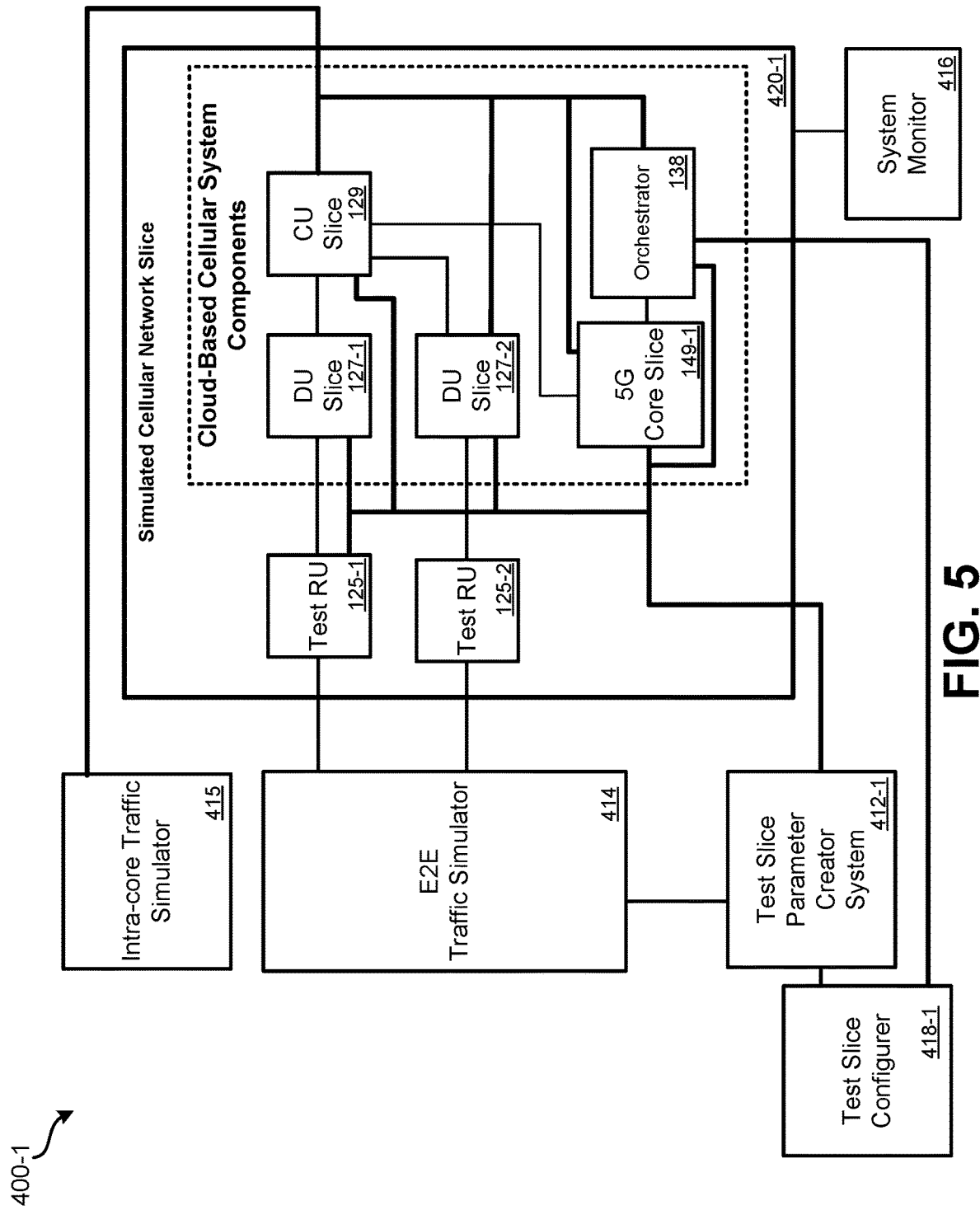
FIG. 5 illustrates a slice testing system, in accordance with certain embodiments according to the present disclosure.

FIG. 5 illustrates a slice testing system 400-1, in accordance with certain embodiments according to the present disclosure. The slice testing system 400-1 may be integrated with the system 200 such that each environment of the system 200 may include and/or make use of one or more aspects of a respective slice testing system 400-1. The slice testing system 400-1 may correspond to a particularized version of the test system 400 specifically configured for slice testing. Thus, the slice testing system 400-1 may additionally or alternatively include a test slice parameter creator system 412-1, a test slice configurer 418-1, and simulated cellular network slice 420-1. Simulated cellular network 420 can represent an embodiment of the cellular network that is being simulated at varying levels of complexity, such as disclosed above with respect to the test environments. For simulated cellular network 420, components that are not executed using exclusively general-purpose computing equipment, such as radio units, may also be simulated.

Slices may be created for particular types of testing and testing parameters and may allow dedication of traffic or pathing within one network, without having to spin up a second network or a third network, to keep traffic segregated and/or only run specific traffic through the partition. Slicing may provide the ability through the partition to, on the same network, run dedicated traffic and/or dedicated functionality in a piece of the network. For example, the system 200 may receive one or more requests from a service provider system 105 that may correspond to a slice request, i.e., a request for one or more slices. For example, the system 200 may transmit content to facilitate a user interface with a client device to allow for one or more selections corresponding to the one or more slices, slice types, slice locations, one or more specific slice tests, and/or the like, one or a combination of which may be selected via selectable interface elements and submitted with one or more requests.

In one example out of many possible examples, responsive to one or more requests, the slice testing may correspond to test of connected vehicle without testing general purpose eMBB broadband consumption. The slice testing system 400-1 may create one or more slices specifically configured to support the requirements of a connected vehicle type application (versus another slice for standard video streaming or surfing the Internet, for example). The slice testing system 400-1 may tune and configure bandwidth, latency, availability to take into account the requirements of that test case, whereas other test cases may not require high bandwidth, low latency, high availability. The slice testing system 400-1 may create slices tuned to various specific use cases (e.g., remote surgery, first responder, etc.) to allow each particular service provider system 150 to focus-develop and focus-test the how the particular service provider system 150 would use the slice and to validate with the test slices before using their features and services in production. Accordingly, the system 200 may provide for any number of slices available in the network of networks, existing for the duration needed. Each slice may be specified to have a portion of the underlying network but may be augmented as needed.

Advantageously, the slice testing system 400-1 may be integrated with the system 200 such that only one software repository may be needed. While, in some embodiments, each environment of the system 200 may have its own software repository 225, for example, to facilitate management of versioning control, the slice testing system 400-1 may use only one software repository because the slice testing system 400-1 writes to the orchestrator 138 so that the orchestrator 138 maintains what is (e.g., versioning, SLAs, etc.) in which slices. The orchestrator 138 may function as an end-to-end orchestrator and repository for the network. Thus, some embodiments may include only one software repository 225.

The orchestrator 138 may be configured to provide intelligence for the overall system 200 to execute different components within the network. The orchestrator 138 may drive work that needs to be done in the network based on one or a combination of human interaction information, modeling information, machine-learning information, and/or the like. The orchestrator 138 may include one or more processing devices configured to intelligently orchestrate features of the system 200, may trigger the CI/CD pipelines, may cause instantiation of the environments, and may control the environments, among other things. For example, responsive to one or more slice requests, the orchestrator 138 may trigger creation of the requested slice and may provide a set of slice specifications for the slice in accordance with slice rules. In response, the test slice configurer 318 may parse the set of slice specifications into configuration specifications that specify the configurations of one or more test RUs 125, one or more DU slices 127, a CU slice 129, components of the 5G core slice 139, and/or the like. The test slice parameter creator system 312 may identify the parameters for instantiation of the slice and may issue instructions to create the instantiation of the one or more test RUs 125, the one or more DU slices 127, the CU slice 129, the components of the 5G core slice 139, and/or the like in accordance with the parameters. Accordingly, test slice parameters may vary from one slice to another.

In some embodiments, to allow for controlling testing end-to-end, the system 200 may create one or more test RUs 125 dedicated to a particular test slice that completely isolate the testing traffic over that created network slice. Further, the DU has a scheduler that prioritizes that way packets going back and forth between 5G Core and radio unit are set up and sent. In some embodiments, the system 200 may test a new scheduler versus another slice where running general-purpose scheduler.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations may provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A method for multi-environment cellular network development and testing, the method comprising:
    creating a plurality of cloud-based environments that are configured according to a hierarchical order and that allow for development and/or testing of features and/or services with respect to a cellular network, wherein one or more cloud-based environments of the plurality of cloud-based environments are configured to provide a simulated cellular network that is a clone of at least some configurations of the cellular network that is running in production;

communicatively coupling the plurality of cloud-based environments to one or more software repositories via a first plurality of pipelines;

communicatively coupling the plurality of cloud-based environments to one or more issue monitors via a second plurality of pipelines; and exposing the plurality of cloud-based environments to service provider systems and allowing the service provider systems to develop and/or test features and/or services in parallel with respect to real cellular network traffic of the cellular network within the plurality of cloud-based environments, wherein each service provider may develop its own network functions in its development environment.

2. The method for multi-environment cellular network development and testing as recited in claim 1, where, consequent to software being received in at least one software repository of the one or more software repositories, the software is introduced into one environment of the plurality of cloud-based environments according to the hierarchical order to allow testing and/or development of the software within the one environment.

3. The method for multi-environment cellular network development and testing as recited in claim 2, where, consequent to validation of the software within the one environment, the software or a version of the software is promoted to a next environment of the plurality of cloud-based environments according to the hierarchical order to allow additional testing and/or development of the software or the version of the software within the next environment.

4. The method for multi-environment cellular network development and testing as recited in claim 3, where, consequent to detection of one or more issues with the software or the version of the software within at least one environment of the plurality of cloud-based environments, at least one issue monitor of the one or more issue monitors log the one or more issues, and the software or the version of the software is returned to a lower of the plurality of cloud-based environments according to the hierarchical order to allow remediation of the one or more issues.

5. The method for multi-environment cellular network development and testing as recited in claim 1, where at least some of the plurality of cloud-based environments are virtual development environments instantiated via a cloud infrastructure.

6. The method for multi-environment cellular network development and testing as recited in claim 1, where at least some of the plurality of cloud-based environments are virtual integration environments instantiated via a cloud infrastructure.

7. The method for multi-environment cellular network development and testing as recited in claim 1, where the plurality of cloud-based environments allow for development and/or testing of the features and/or the services with respect to the cellular network based at least in part on specifications of one or more network states.

8. A system to facilitate multi-environment cellular network development and testing, the system comprising:

one or more processing devices communicatively coupled to memory communicatively coupled with and readable by the one or more processing devices and having stored therein processor-readable instructions which, when executed by the one or more processing devices, configure the system to perform operations comprising:

creating a plurality of cloud-based environments that are configured according to a hierarchical order and that allow for development and/or testing of features and/or services with respect to a cellular network, wherein one or more cloud-based environments of the plurality of cloud-based environments are configured to provide a simulated cellular network that is a clone of at least some configurations of the cellular network that is running in production;

communicatively coupling the plurality of cloud-based environments to one or more software repositories via a first plurality of pipelines;

communicatively coupling the plurality of cloud-based environments to one or more issue monitors via a second plurality of pipelines; and exposing the plurality of cloud-based environments to service provider systems and allowing the service provider systems to develop and/or test features and/or services in parallel with respect to real cellular network traffic of the cellular network within the plurality of cloud-based environments, wherein each service provider may develop its own network functions in its development environment.

9. The system to facilitate multi-environment cellular network development and testing as recited in claim 8, where, consequent to software being received in at least one software repository of the one or more software repositories, the software is introduced into one environment of the plurality of cloud-based environments according to the hierarchical order to allow testing and/or development of the software within the one environment.

10. The system to facilitate multi-environment cellular network development and testing as recited in claim 9, where, consequent to validation of the software within the one environment, the software or a version of the software is promoted to a next environment of the plurality of cloud-based environments according to the hierarchical order to allow additional testing and/or development of the software or the version of the software within the next environment.

11. The system to facilitate multi-environment cellular network development and testing as recited in claim 10, where, consequent to detection of one or more issues with the software or the version of the software within at least one environment of the plurality of cloud-based environments, at least one issue monitor of the one or more issue monitors log the one or more issues, and the software or the version of the software is returned to a lower of the plurality of cloud-based environments according to the hierarchical order to allow remediation of the one or more issues.

12. The system to facilitate multi-environment cellular network development and testing as recited in claim 8, where the plurality of cloud-based environments allow for development and/or testing of the features and/or the services with respect to the cellular network based at least in part on specifications of one or more network states.

13. The system to facilitate multi-environment cellular network development and testing as recited in claim 8, where at least some of the plurality of cloud-based environments are virtual development environments instantiated via a cloud infrastructure.

14. The system to facilitate multi-environment cellular network development and testing as recited in claim 8, where at least some of the plurality of cloud-based environments are virtual integration environments instantiated via a cloud infrastructure.

15. One or more non-transitory, machine-readable media having machine-readable instructions thereon which, when executed by one or more processing devices, cause the one or more processing devices to perform operations comprising:
   creating a plurality of cloud-based environments that are configured according to a hierarchical order and that allow for development and/or testing of features and/or services with respect to a cellular network, wherein one or more cloud-based environments of the plurality of cloud-based environments are configured to provide a simulated cellular network that is a clone of at least some configurations of the cellular network that is running in production;
   communicatively coupling the plurality of cloud-based environments to one or more software repositories via a first plurality of pipelines;
   communicatively coupling the plurality of cloud-based environments to one or more issue monitors via a second plurality of pipelines; and
   exposing the plurality of cloud-based environments to service provider systems and allowing the service provider systems to develop and/or test features and/or services in parallel with respect to real cellular network traffic of the cellular network within the plurality of cloud-based environments, wherein each service provider may develop its own network functions in its development environment.

16. The one or more non-transitory, machine-readable media as recited in claim 15, where, consequent to software being received in at least one software repository of the one or more software repositories, the software is introduced into one environment of the plurality of cloud-based environments according to the hierarchical order to allow testing and/or development of the software within the one environment.

17. The one or more non-transitory, machine-readable media as recited in claim 16, where, consequent to validation of the software within the one environment, the software or a version of the software is promoted to a next environment of the plurality of cloud-based environments according to the hierarchical order to allow additional testing and/or development of the software or the version of the software within the next environment.

18. The one or more non-transitory, machine-readable media as recited in claim 17, where, consequent to detection of one or more issues with the software or the version of the software within at least one environment of the plurality of cloud-based environments, at least one issue monitor of the one or more issue monitors log the one or more issues, and the software or the version of the software is returned to a lower of the plurality of cloud-based environments according to the hierarchical order to allow remediation of the one or more issues.

19. The one or more non-transitory, machine-readable media as recited in claim 15, where at least some of the plurality of cloud-based environments are virtual development environments instantiated via a cloud infrastructure.

20. The one or more non-transitory, machine-readable media as recited in claim 15, where at least some of the plurality of cloud-based environments are virtual integration environments instantiated via a cloud infrastructure.

* * * * *